United States Patent [19]

Kakegawa et al.

[11] Patent Number: 4,468,744
[45] Date of Patent: Aug. 28, 1984

[54] SCINTILLATION CAMERA

[75] Inventors: Makoto Kakegawa, Otawara; Mineki Nishikawa, Tochigi; Tomohiko Kihara, Otawara, all of Japan

[73] Assignee: Tokyo Shibaura Denki Kabushiki Kaisha, Kawasaki, Japan

[21] Appl. No.: 264,868

[22] Filed: May 18, 1981

[30] Foreign Application Priority Data

Jun. 2, 1980 [JP] Japan ................................ 55-73891

[51] Int. Cl.³ .............................................. G01T 1/20
[52] U.S. Cl. ................................... 364/527; 364/414; 250/363 R; 250/369
[58] Field of Search ..................... 364/414, 527, 525; 250/363 R, 369; 315/31 R

[56] References Cited

U.S. PATENT DOCUMENTS

| | | | |
|---|---|---|---|
| 3,011,057 | 11/1961 | Anger | 250/71.5 |
| 4,060,730 | 11/1977 | Zioni et al. | 364/525 X |
| 4,075,485 | 2/1978 | Lijewski et al. | 250/363 R X |
| 4,258,428 | 3/1981 | Woronowicz | 364/527 |
| 4,316,257 | 2/1982 | Medico et al. | 250/363 R X |

Primary Examiner—Edward J. Wise
Attorney, Agent, or Firm—Finnegan Henderson Farabow Garrett & Dunner

[57] ABSTRACT

In a scintillation camera having apparatus for shortening waveforms, a regulating circuit for preventing display of signals representing unwanted γ rays having excessive intensity including a device for comparing the peak of the shortened waveform representing the total light energy received by the camera from the γ ray with a preset reference range between an upper limit and the saturation level of the pre-amplifiers of the camera and for generating a signal while the total light energy exceeds the reference range, a circuit for generating an output for a predetermined time after the signal ceases and an AND gate for blocking access to the display during the period of the output.

2 Claims, 8 Drawing Figures

SCINTILLATION CAMERA

BACKGROUND OF INVENTION

This invention relates to a scintillation camera.

Such a device as is shown in FIG. 1 has been conventionally used as a scintillation camera for obtaining a distribution image of radioisotopes in the body of a patient so as to examine the condition of an affected portion.

In FIG. 1, a collimator 1 is made receptive of $\gamma$ rays emitted from a not-shown body to be examined and a scintillator 2 made of sodium iodine (NaI) or the like emits a light in response to $\gamma$ rays which have passed through the collimator 1. A light guide 3 channels the light which has been generated by the scintillator 2. Photoelectron multipliers $4_1$ to $4_n$ convert the light rays, which have been led through the light guide 3, into electric signals corresponding to the light received. Pre-amplifiers $5_1$ to $5_n$ respectively amplify the outputs of photoelectron multipliers $4_1$ to $4_n$, which are two-dimensionally arranged on the back side of the light guide 3.

Resistance matrix circuits 6 and 7 for X- and Y-directions, respectively, weigh the outputs of the pre-amplifiers $5_1$ to $5_n$ in a manner to correspond to the coordinate positions of the photoelectron multipliers $4_1$ to $4_n$. An adder 8 sums the outputs of the pre-amplifiers $5_1$ to $5_n$ to generate a signal Z which is proportional to the total energy of the individual incident $\gamma$ rays. The signals of pre-amplifiers $5_1$ to $5_n$ have a pulse width of about $2\mu$'s and a waveform, as shown in FIG. 2(a), which has a peak proportional to the light rays received by the photoelectron multipliers $4_1$ to $4_n$. The resistance matrix circuits 6 and 7 and adder 8 have such characteristics as amplify the outputs of the pre-amplifiers $5_1$ to $5_n$ in a manner to have similar waveforms.

Waveform shortening circuits $9_1$ to $9_3$ are operative to shorten the output pulse widths of the resistance matrix circuits 6 and 7 and adder 8. The circuits $9_1$ to $9_3$ have a well-known construction, as shown in FIG. 3, in which resistors $R_1$ and $R_2$ and a transistor $TR_1$ embody an emitter-follower acting as an input buffer. An operational amplifier $IC_1$, a condenser $C_2$, and resistors $R_3$, $R_4$, $R_5$ and $R_6$ comprise a pulse-shortening circuit. The operational amplifier $IC_1$ uses a wide-band operational amplifier such as CA 3100 (which is made by RCA Corporation), for example. On the other hand, the parallel condenser $C_2$ and resistor $R_3$ have a capacitance of about 22 pF and a resistance of about 10K $\Omega$, for example, so that pulses having a width of about $2\mu$'s, as shown in FIG. 4, are changed to have a waveform having a width of about $1\mu$, as indicated by the broken line. Clipping diodes $D_1$ and $D_2$ are operative to restrict the upper and lower limits of the output of the operational amplifier $IC_1$.

Reverting now to FIG. 1, dividers 10 and 11 develop the analog equivalents of the outputs of the resistance matrix circuits 6 and 7 and the adder 8, as shortened by the waveform shortening circuits $9_1$ to $9_3$, to the form expressed by X/Z and Y/Z. The resultant signals are fed as the final position signals x and y of the incident positions of the $\gamma$ rays to a CRT display 12 for the scintigram display.

A peak height analyzer (PHA) 13 of single channel type receives the shortened signal output Z of the adder 8 through the circuit $9_3$ for generating peak-analyzed output pulses when the input of PHA 13 has a peak falling in the range between preset peak values VH and VL (VH>VL). These peak values VH and VL are called the window levels of the PHA 13 of which the level VH is called the higher level whereas the level VL is called the lower level.

An unblanking circuit 14 generates an unblanking signal UNB to a cathode ray tube (CRT) 12 from the output pulses of the PHA 13, in accordance with the operating time periods of the dividers 10 and 11.

With the construction thus far described, the $\gamma$ rays emitted from the patient being examined are incident through collimator 1 upon the scintillator 2 so that the scintillator 2 has its incident points illuminated with an intensity corresponding to the energy of the $\gamma$ rays. The resultant light rays are led through the light guide 3 into the photoelectron multipliers $4_1$ to $4_n$ so that they generate electric signals corresponding to the quantities of the light incident thereupon. These electric signals are amplified by the corresponding pre-amplifiers $5_1$ to $5_n$, and the amplified signals are fed to the resistance matrix circuits 6 and 7 for the X- and Y-axis directions so that they may be weighed to correspond to the coordinate positions where the receiving photoelectron multipliers $4_1$ to $4_n$ are positioned.

Thus, the electric signals are weighed to correspond to the coordinate positions by the respective resistance matrix circuits 6 and 7 and composed so that they are fed out as signals having X- and Y-axis components at levels corresponding to the coordinate positions. On the other hand, the outputs of the pre-amplifiers $5_1$ to $5_n$ are also fed to the adder 8, in which they are summed and fed out as the signal Z. The signal Z has its pulse width shortened by the waveform shortening circuit $9_3$. Likewise, the outputs of the resistance matrix circuits 6 and 7 have their pulse width shortened by the waveform shortening circuits $9_1$ and $9_2$, respectively.

These shortening operations are performed to enhance the efficiency of counting the $\gamma$ rays. Since the time width of the detected signal, per one pulse of the $\gamma$ ray, has a value of about $2\mu$'s, as shown at curve a in FIG. 4, in order that $\gamma$ rays incident at random may be trapped and displayed as often as possible, the pulse width is shortened, as shown in a curve b in FIG. 4, with a view to shortening the time period which is required for processing the $\gamma$ rays per one pulse. The signals, which have their waveforms shortened by the waveform shortening circuits $9_1$ and $9_2$ and which correspond to the positions of the X- and Y-axis components, are fed to dividers 10 and 11, in which they are divided by the output of the waveform shortening circuit $9_3$ for the signal Z for an analog output and are then fed as the X and Y coordinate signals, respectively, to the CRT 12, which indicate such a position upon the CRT display 12 as corresponds to the incident position of the $\gamma$ ray.

In other words, although the scintillator 2 emits light rays with an illumination corresponding to the energy of the incident $\gamma$ rays so that the photoelectron multipliers $4_1$ to $4_n$ receive the light rays and generate electric signals having levels corresponding to the quantities of the light incident thereupon and although the electric signals are weighed by the resistance matrix circuits 6 and 7 in a manner to correspond to the positions detected by the photoelectron multipliers $4_1$ to $4_n$, the resultant signals do not indicate the absolute position of the light rays, since they are varied in accordance with the energy level of the individual $\gamma$ rays.

Consequently, the differences in the energy levels are compensated for by dividing the X and Y signals by the signal Z which is the output of the adder 8 so that the X and Y coordinate signals indicating the correct incident position coordinates of the γ ray are obtained.

Additionally, the output signal Z of the adder 8, which has passed through the waveform shortening circuit $9_3$, is also fed to the PHA 13 to determine whether or not it is at such a level as falls in the energy range of the radioactive γ ray of the relevant radioisotope. By this operation, cosmic rays or other radioactive rays generating noise components are eliminated. If the output signal Z is within the required energy range, the PHA 13 generates pulses, which are fed to the unblanking circuit 14. Upon reception of these pulses, the unblanking circuit 14 generates the unblanking signal UNB, which is fed as a brightness signal (i.e., the z-axis signal) to the CRT display 12. As a result, the CRT display 12 displays a bright spot in such a position of the display surface as is determined by the X and Y coordinate signals generated by the dividers 10 and 11.

Thus, for each relevant γ ray a bright point is developed and displayed in the frame position of the CRT display 12 corresponding to the incident position of the γ ray. As a result, the scintigram, i.e., the distribution image of the radioisotope in the body of the patient, can be obtained by taking a likeness of the frame with the use of a camera or the like and by thus accumulating the bright points on the film of the camera.

In order to obtain an excellent scintigram with the use of the device thus constructed, it is necessary to detect as many γ rays as possible, even though emitted at random time intervals. In other words, it is necessary to perform the processing operations from the detection to the display of the γ rays per pulse at an interval as short as possible. For this reason, the waveform shortening circuits $9_1$ to $9_3$ are designed to accomplish the waveform shortening operations as widely as possible. In other words, the waveform shortening circuits $9_1$ to $9_3$ are designed to accomplish differentiations thereby to effect conversions into fine pulses.

In this regard, if the time width of a detected signal of a γ ray is long in which case the counting (i.e., the incidence efficiency) of the γ ray incident upon the scintillator 2 is prolonged and a so-called "pile-up" is likely to take place. In this situation, the signal of the next γ ray which is detected is piled upon the prolonged signal of the prior detected γ ray. Since, in this case, the signal level is changed, the waveform shortening operation is utilized so as to suppress the pile-up as much as possible with a view to provide an accurate analysis of the incident positions.

The waveform shortening circuits $9_1$ to $9_3$, having operations thus far described, have the construction shown in FIG. 3. Specifically, if an input terminal IN is fed with an input signal, this input signal is fed to the pulse shortening circuit portion through the transistor $TR_1$ which constitutes an emitter follower so as to reduce the impedance. In the pulse shortening circuit portion, an A.C. component is extracted by the coupling condenser $C_1$ and is differentiated by a differential circuit portion, which is constructed of the condenser $C_2$, the resistors $R_3$, $R_4$ and $R_5$ and the operational amplifier $IC_1$, so that the input signal has its waveform intensified while having its time width shortened. The input signal thus shortened is inverted by the operational amplifier $IC_1$ and is fed out such that it is clipped to be within the upper and lower limits, if it has a level portion exceeding the upper and lower limits, by the actions of the diodes $D_1$ and $D_2$.

The scintillation camera apparatus thus far described has certain disadvantages. For instance, in case γ rays having higher energy than the intended γ ray, e.g., those emitted by a cosmic ray shower or by a background due to the natural radioactivity, the illumination of the scintillator 2 is so intense, because of their high energies, that the quantities of the light coming from the scintillator 2 into the photoelectron multipliers $4_1$ to $4_n$ accordingly increased.

As shown in FIG. 2, for example, the output of the pre-amplifier amplifying the output of a certain photoelectron multiplier having received an excessive light takes such an abnormal waveform as has its peak flattened because of the saturation of the circuit. Since the adder 8 sums the outputs of all the pre-amplifiers $5_1$ to $5_n$, its output is formed with an irregular portion (where a derivative of the first order is discontinuous) at the trailing edge of the waveform, as indicated at I in FIG. 2(c), if there should be one pre-amplifier which generates such an abnormal output due to the saturation as is shown in FIG. 2(b).

The output of the adder 8 is fed to the waveform shortening circuit $9_3$, in which it has its waveform shortened. Since this waveform shortening operation is performed in a differential manner, as has been described hereinbefore, the output waveform shown in FIG. 5(b) is generated if the waveform shortening circuit receives a waveform having an irregular portion. As shown in FIG. 5(a), more specifically, the output waveform shown in FIG. 2(c) is inverted and fed to the waveform shortening circuit $9_3$ so that it is differentially shortened. The differentiation is effected at the discontinuous portion I, i.e., at the rise and break of the waveform shown in FIG. 5(a) so that two pulses i and ii having the levels of that portion are fed out.

The output of the waveform shortening circuit $9_3$ is fed to the PHA 13 and, if the first peak i of the waveform shown in FIG. 5(b) exceeds the upper limit of the limit levels VH and VL of the PHA 13, the PHA 13 generates no output. For the second peak ii however, the output of the waveform shortening circuit $9_3$ may be between the upper and lower limit levels VH and VL. As a result, the PHA 13 generates its output at that time. When the PHA 13 generates the output, the CRT display 12 displays the bright point in a position corresponding to the position signals which are indicated by the divider 11 at that particular time. In this instance, the outputs of the resistance matrix circuits 6 and 7 of the position signal system generate signals corresponding to the position of the distorted waveform. As a result, the outputs of the dividers 10 and 11 do not indicate the incident position of a γ ray but the position relating to the position of the photoelectron multiplier corresponding to the saturated pre-amplifier. Moreover, the output of the PHA 13 generated in response to the peak ii of the input waveform shown in FIG. 5(b), is fed to the unblanking circuit 14 so that an unwanted bright point is displayed in the CRT display 12.

The description thus made with reference to FIG. 2 is but one example, and a variety of mistaken displays may be made in accordance with the energy and position of the incident γ ray. Especially, in case the energy of the γ ray to be measured is low, the energy of a radioactive ray in the background becomes relatively high so that an abnormal accumulated image (i.e., a ghost image)

relating to the position of the photoelectron multipliers appears in the case of an elongated measurement.

SUMMARY OF THE INVENTION

It is accordingly an object of this invention to provide a scintillation camera apparatus in which unwanted bright points generated in response to the saturation of a pre-amplifier by the excessive input from a photoelectron multiplier are suppressed from being displayed so that a scintigram having no ghost image is obtained.

Briefly, this and other objects are achieved in accordance with the invention by constructing a scintillation camera apparatus having a plurality of photoelectric conversion elements arranged at the back side of a scintillator for converting a radioactive ray received by the scintillator into light, pre-amplifiers for amplifying the output signals of the respective elements, circuits for weighing the outputs of the pre-amplifiers to identify the coordinate positions of the elements corresponding to the pre-amplifiers and to generate position signals having the X- and Y-axis components of the light emitting point, a circuit for summing the outputs of the pre-amplifiers waveform shortening circuits for intensifying and thereby shortening the time widths of the waveforms of the position signals and the summed output, a PHA for generating a signal if the peak of the shortened summed output is lower than a predetermined window level and apparatus for generating coordinate signals for a display device, the coordinate signals being a function of the ratio of the shortened individual position signals and the shortened summed output, if below the predetermined window level, the apparatus comprising a regulating circuit for comparing the summed output after having its waveform processed with a preset reference value set at a suitable level within a range between the upper limit of said window level and the saturation level of the pre-amplifiers and for preventing display of the display device for a predetermined time period after the summed output has exceeded the reference.

DESCRIPTION OF THE PREFERRED EMBODIMENT

Figure 7:
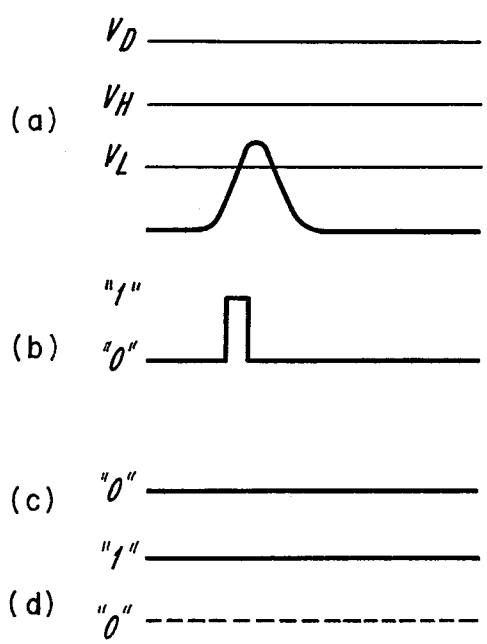
FIGS. 7(a) to (d) are time charts for explaining the operation of the invention when a normal input is received.
Figure 8:
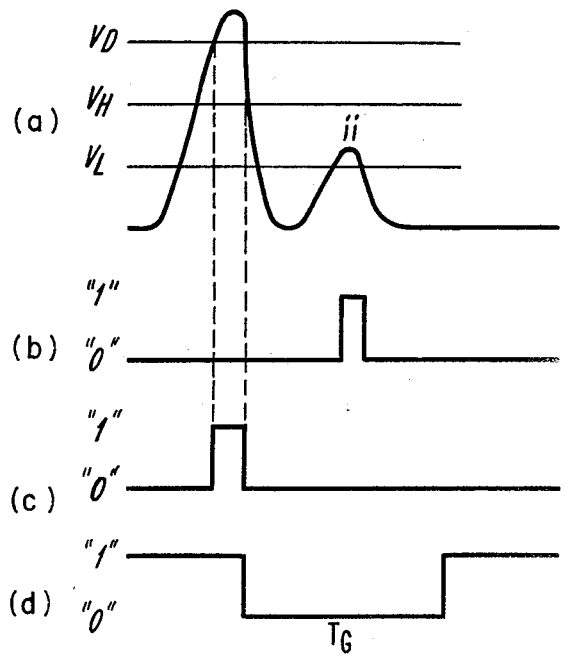
FIGS. 8(a) to (d) are time charts for explaining the operation of the invention when an abnormal input is received.

This invention will now be described in connection with one embodiment thereof with reference to FIGS. 6 to 8.

Figure 1:
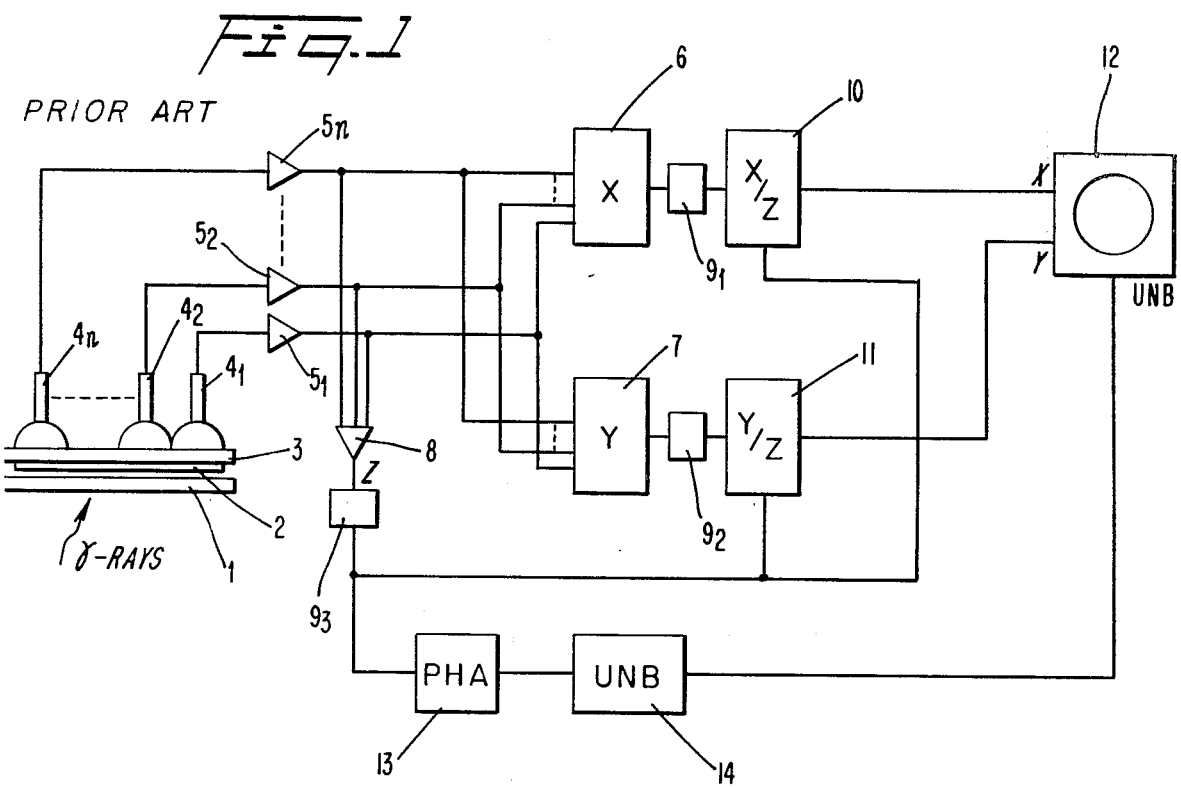
FIG. 1 is a block diagram showing the construction of a scintillation camera apparatus according to the prior art.
Figure 2:
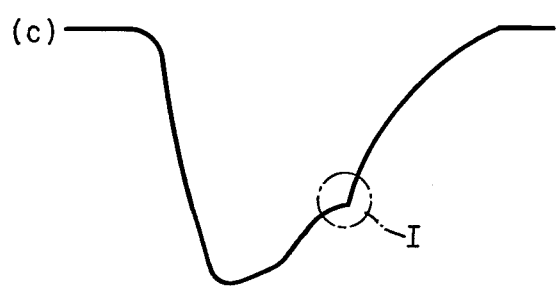
FIGS. 2(a) to (c) are graphs for illustrating the outputs of both the pre-amplifiers and adder of the apparatus of FIG. 1.
Figure 3:
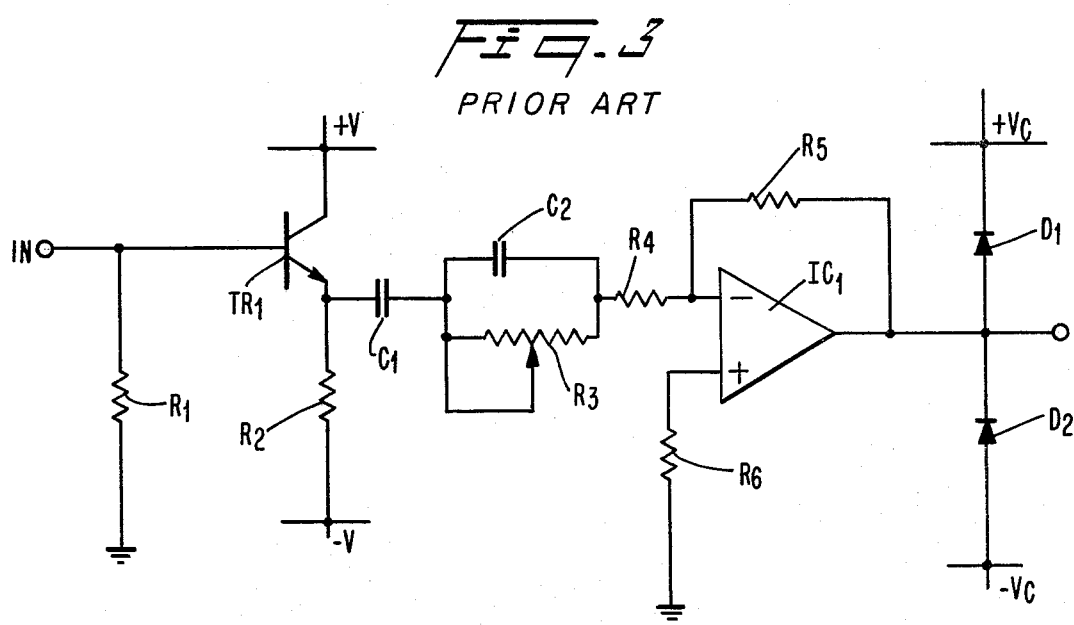
FIG. 3 is a circuit diagram showing the waveform shortening circuit which is generally used in the apparatus of FIG. 1.
Figure 4:
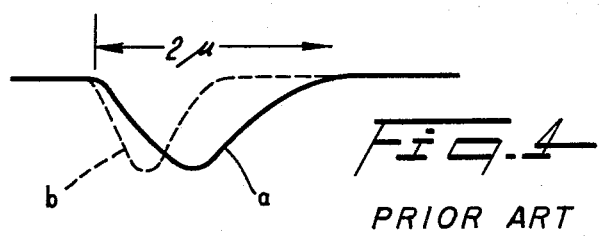
FIG. 4 is a diagram showing both a waveform, which has been shortened by the waveform shortening circuit of FIG. 3, and the original waveform.
Figure 5:
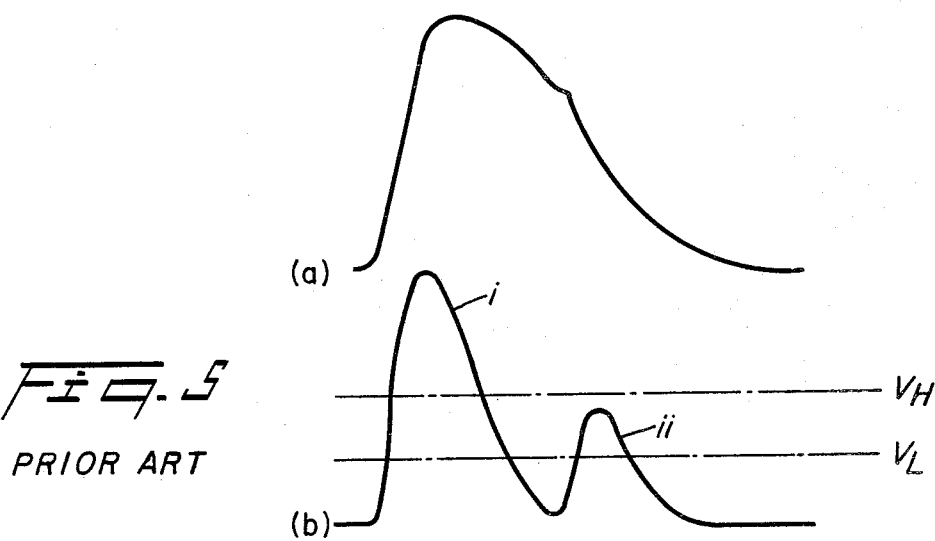
FIGS. 5(a) and (b) are diagrams illustrating both the output waveform of the adder of FIG. 1 resulting from a high energy γ ray and the succeeding shortened output waveform of the waveform shortening circuit of FIG. 3.
Figure 6:
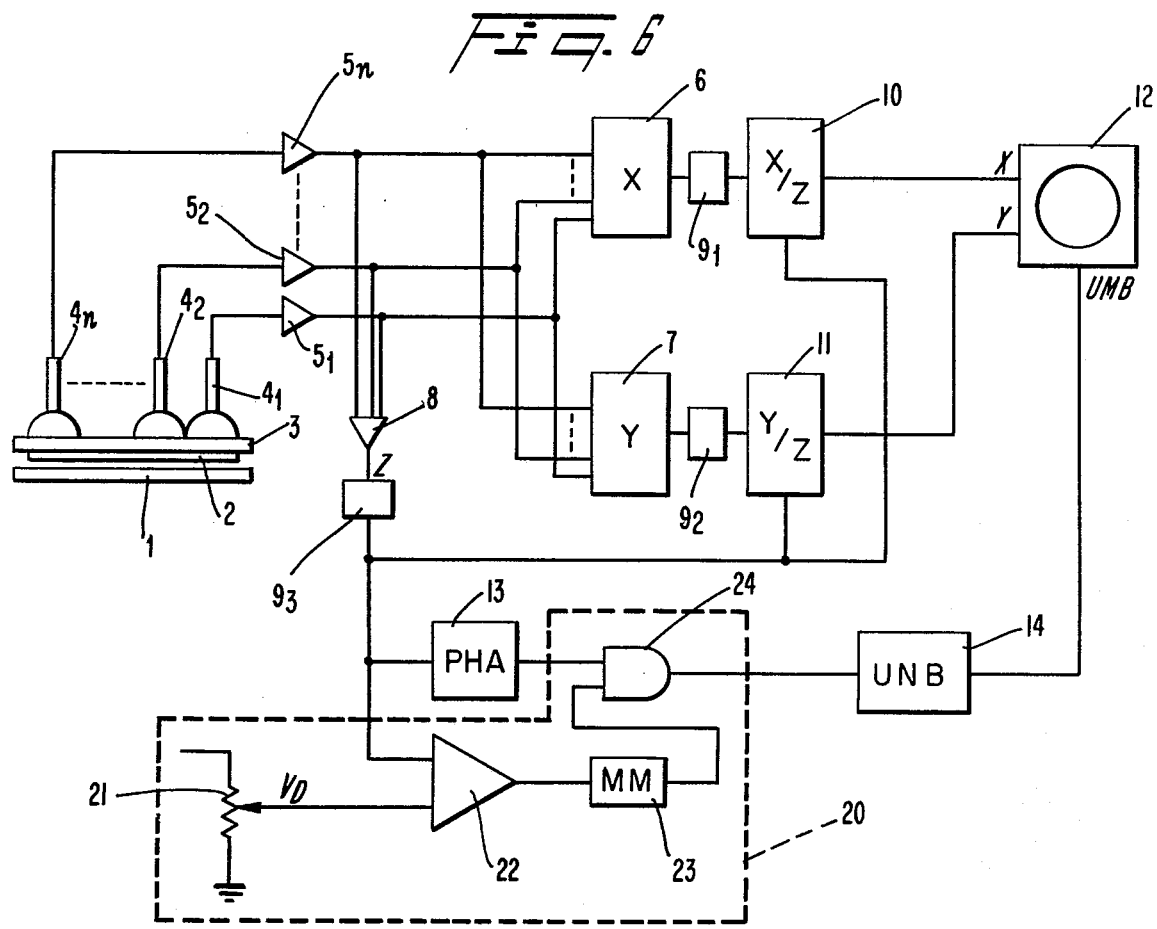
FIG. 6 is a block diagram showing one embodiment of this invention.

In FIG. 6 the parts indicated at numerals 1 to 14 have the same construction as those of the same numerals shown in FIG. 1 and their descriptions will not be repeated. According to the invention, there is additionally provided at the output of the PHA 13 a regulating circuit 20 which is operative to compare the output of the waveform shortening circuit $9_3$ with a reference value suitably preset within a range higher than the upper limit value $V_H$ of the window level of the PHA 13 and lower than the signal saturating level of the pre-amplifiers $5_1$ to $5_n$ so that the output of the PHA 13 is blocked for a predetermined time period after the output of the waveform shortening circuit $9_3$ exceeds the reference value.

The regulating circuit 20 is composed for a presetter 21 for presetting the reference (voltage) value, a comparator 22 for comparing the output of the waveform shortening circuit $9_3$ with the value preset by the presetter 21 thereby to generate a signal when that output exceeds the preset reference value, a monostable multivibrator 23 adapted to be triggered by the signal generated by the comparator 22 for generating negative polarity pulses having a predetermined time width, and an AND gate circuit 24 having its gate controlled by the output of monostable multivibrator 23 for controlling the signal fed from the PHA 13 to the unblanking circuit 14.

The comparator 22 generates an output at a logic level "1" during the period while the output of the waveform shortening circuit $9_3$ is higher than the preset value $V_D$. The monostable multivibrator 23 is triggered by the break (having its level shifted from "1" to "0") of the output of the comparator 22 so that it has the logic level "0" for a preset time period $T_G$ but has the logic level "1" for the remaining time period. The output of the monostable multivibrator 23 is fed to the AND gate circuit 24 together with the output of the PHA 13 so that the output of the PHA 13 is blocked by the AND gate circuit 24 and is not fed to the unblanking circuit 14 when the output of the monostable multivibrator 23 is at the level "0".

On the other hand, the time width of the outputs of the monostable multivibrator 23 is preset at the most suitable one for the efficiency of counting of the γ rays, while considering any periods during which an erroneous output is fed out of the PHA 13 as a result the fact that any of the pre-amplifiers $5_1$ to $5_n$ is saturated by the incidence of a γ ray having too high energy and acting as a noise component.

With the construction thus far described, when a γ ray having a level to be measured appears, the output level of the waveform shortening circuit $9_3$ falls in the normal range within the window level (from VH to VL) as shown in FIG. 7(a), so that the comparator 22 has an output at the level "0", as shown in FIG. 7(c). As a result, the monostable multivibrator 23 is left inoperative, as shown in FIG. 7(d). As a further result, the AND gate circuit 24 is under the condition of having its gate opened, and an output is fed out of the PHA 13, as shown in FIG. 7(b). This output is transmitted through the AND gate 24 to the unblanking circuit 14 so that the unblanking signal UNB is fed out of the unblanking circuit 14, whereby a bright point is displayed in the CRT display 12.

In case a γ ray having an abnormally high level appears, the two peaks i and ii are generated from the wavefrom shortening circuit $9_3$ for the aforementioned reason, as shown in FIG. 8(a). Upon reception of this signal, the monostable multivibrator 23 has its output at the level "0" for the predetermined time period $T_G$, as shown in FIG. 8(d). This predetermined time period $T_G$ is preset to be slightly wider than the interval between the first and second peaks i and ii, as shown in FIG. 8(a).

The second peak ii is generated by the distortion of the waveform due to the saturation of any of the pre-amplifiers so that it is frequently within the window level of the peak analyzer 13. When the second peak ii is within the window level, as in the case shown in FIG. 8(a), therefore, the output is fed out of the PHA 13, as shown in FIG. 8(b), but is blocked because the AND gate circuit 24 is closed by the output of the monostable multivibrator 23 so that it fails to be transmitted to the unblanking circuit 14.

In particular, since the level of a peak i, when it is generated, exceeds the preset value $V_D$, the signal at the level "1" is fed out of the comparator 22, as shown in FIG. 8(c), and the monostable multivibrator 23 generates an output at the level "0" for the time period $T_G$, as shown in FIG. 8(d), when the output of the comparator 22 is broken. As a result, the AND gate circuit 24 responds to the output at the level "0" to close its gate for the time period $T_G$. Since the output of the PHA 13 thereby is blocked by the AND gate circuit 24 and the unblanking circuit 14 has no input, the unblanking signal is not generated so that no bright point is displayed in the CRT display 12.

The reason why the monostable multivibrator 23 is triggered at the break of the output of the comparator 22 will be described in the following. There is a relationship to the fact that the time period from the peak i to the peak ii is elongated for the higher level of the first peak i. If the triggering operation is performed at the rise, therefore, the output level of the monostable multivibrator 23 restores the level "1" from the level "0" so that the output resulting from the second peak ii may possibly be fed out later. Moreover, since the instant when the output of the waveform shortening circuit $9_3$ first exceeds the preset value $V_D$ and the instant when the same output descends to pass through the preset value $V_D$ are substantially proportional to each other, if the intrinsic level of the first peak i is high, the output of the PHA 13 is to be generated upon the generation of the second peak ii can be controlled irrespective of the level of the first peak i if the triggering operation is effected at the break of the output of the comparator 22.

What is claimed is:

1. In a scintillation camera apparatus of a type having a plurality of photoelectric conversion elements arranged at the back side of a scintillator for converting a radioactive ray received by the scintillator into light, pre-amplifiers for amplifying the output signals of the respective elements, circuits for weighing the outputs of the pre-amplifiers to identify the coordinate positions of the elements corresponding to the pre-amplifiers and to generate position signals having the X- and Y-axis components of the light emitting point, a circuit for summing the outputs of the pre-amplifiers, waveform shortening circuits for intensifying and thereby shortening the time widths of the waveforms of the position signals and the summed output, a peak height analyzer for generating a signal if the peak of the shortened summed output is lower than a predetermined window level, and means for generating coordinate signals for a display device, the coordinate signals being a function of the ratio of the shortened individual position signals and the shortened summed signal if below the predetermined window level, the improvement comprising regulating circuit means for establishing a preset reference value set at a predetermned level within a range between the upper limit of said window level and the saturation level of said pre-amplifiers, means for comparing said summed output with said preset reference value and means for preventing any display on said display device for a predetermined time period after said summed output has exceeded said reference value.

2. The improvement in a scintillation camera apparatus of claim 1, wherein said regulating circuit means includes:
   a presetter for presetting said reference;
   a comparator both for comparing said shortened summed output with the reference preset by said presetter and for generating a signal when said summed output exceeds said reference;
   a circuit for generating an output for a predetermined time period after the output of said comparator ceases; and
   means for blocking the output of said peak height analyzer during the period while the last-mentioned circuit is generating its output.

* * * * *